US012291908B2

(12) United States Patent
Marega et al.

(10) Patent No.: US 12,291,908 B2
(45) Date of Patent: May 6, 2025

(54) ROLLER ASSEMBLY FOR A SLIDING VEHICLE DOOR

(71) Applicants: Ningbo Geely Automobile Research & Development Co., Ltd., Ningbo (CN); Zhejiang Geely Holding Group Co., Ltd., Zhejiang (CN)

(72) Inventors: Luca Marega, Lilla Edet (SE); Koteswara Rao Buravalli, Gothenburg (SE)

(73) Assignees: NINGBO GEELY AUTOMOBILE RESEARCH & DEV. CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 302 days.

(21) Appl. No.: 17/849,619

(22) Filed: Jun. 25, 2022

(65) Prior Publication Data
US 2022/0325568 A1 Oct. 13, 2022

Related U.S. Application Data

(63) Continuation of application No. PCT/CN2021/073248, filed on Jan. 22, 2021.

(51) Int. Cl.
*E05D 15/06* (2006.01)
*B60J 5/06* (2006.01)
*E05D 15/10* (2006.01)

(52) U.S. Cl.
CPC ............ *E05D 15/0665* (2013.01); *B60J 5/06* (2013.01); *E05D 15/0678* (2013.01);
(Continued)

(58) Field of Classification Search
CPC .............. E05D 15/0678; E05D 15/101; E05D 15/0665; E05D 2015/1031;
(Continued)

(56) References Cited

U.S. PATENT DOCUMENTS 3,829,929 A * 8/1974 Foltz ................... E05D 15/063
                                                   292/DIG. 20
4,559,740 A * 12/1985 Tuchiya ............... E05D 15/1047
                                                     49/223
(Continued)

FOREIGN PATENT DOCUMENTS

CN         104742701 A     7/2015
CN         108025626 A     5/2018
(Continued)

OTHER PUBLICATIONS

Translation of DE102022119779A1, printed Aug. 30, 2024.*
International Search Report from International Application No. PCT/CN2021/073248, Apr. 21, 2021, 2 pages.

*Primary Examiner* — Jason S Morrow
(74) *Attorney, Agent, or Firm* — Tucker Ellis LLP

(57) ABSTRACT

A roller assembly for a sliding vehicle door includes a bracket structure having a first and second inner horizontal guide roller arranged to interact with an inner vertical surface of the track member. The bracket structure further includes at least a first and second vertical guide roller arranged to interact with a first inner surface of the track member, a resiliently arranged rotatable member arranged to interact with a second inner surface of the track member and at least one outer horizontal guide roller arranged to interact with an outer vertical surface of the track member.

14 Claims, 9 Drawing Sheets

(52) U.S. Cl.
CPC ....... *E05D 15/101* (2013.01); *E05D 15/1047* (2013.01); *E05D 2015/1026* (2013.01); *E05Y 2201/64* (2013.01); *E05Y 2201/692* (2013.01); *E05Y 2800/35* (2013.01)

(58) Field of Classification Search
CPC ........ E05D 2015/1028; E05D 15/1047; E05Y 2201/64; E05Y 2201/688; E05Y 2201/692; B60J 5/06
USPC ......................................................... 296/155
See application file for complete search history.

(56) References Cited

U.S. PATENT DOCUMENTS

| | | | | |
|---|---|---|---|---|
| 7,669,367 | B2 * | 3/2010 | Shimura | E05D 15/1047 49/213 |
| 9,637,968 | B2 * | 5/2017 | Guitar | E05D 15/581 |
| 9,701,183 | B2 * | 7/2017 | Choi | E05D 15/101 |
| 10,384,519 | B1 | 8/2019 | Brown | |
| 10,596,884 | B2 * | 3/2020 | Biesenbruck | B60J 5/065 |
| 11,525,293 | B2 * | 12/2022 | Yun | E05D 15/0621 |
| 11,572,726 | B2 * | 2/2023 | Choi | E05B 85/243 |
| 11,629,539 | B2 * | 4/2023 | Choi | E05D 15/101 49/164 |
| 11,781,367 | B2 * | 10/2023 | Choi | E05F 15/619 49/362 |
| 11,913,267 | B2 * | 2/2024 | Bettcher, III | E05D 3/02 |
| 11,945,288 | B2 * | 4/2024 | Choi | E05B 85/26 |
| 11,987,106 | B2 * | 5/2024 | Choi | E05C 17/203 |
| 2007/0033877 | A1 | 2/2007 | Goebel | |
| 2011/0089714 | A1 | 4/2011 | Kitayama | |
| 2013/0154305 | A1 | 6/2013 | Thiele | |
| 2020/0240186 | A1 * | 7/2020 | Kuroiwa | E05D 15/1047 |

FOREIGN PATENT DOCUMENTS

| | | | | |
|---|---|---|---|---|
| CN | 209353937 | U | 9/2019 | |
| DE | 1708173 | C3 | 6/1978 | |
| DE | 202004021803 | U1 | 2/2011 | |
| DE | 102022119779 | A1 * | 3/2023 | ........... E05D 15/063 |
| EP | 3258043 | A1 | 12/2017 | |
| EP | 3315699 | A1 | 5/2018 | |
| JP | 2006257704 | A | 9/2006 | |
| WO | 2013154833 | A1 | 10/2013 | |

* cited by examiner

ROLLER ASSEMBLY FOR A SLIDING VEHICLE DOOR

RELATED APPLICATION DATA

This application is a continuation of International Patent Application No. PCT/CN2021/073248, filed Jan. 22, 2021, which claims the benefit of European Patent Application No. 20154896.3, filed Jan. 31, 2020, the disclosures of which are incorporated herein by reference in their entireties.

TECHNICAL FIELD

The disclosure relates to a roller assembly for a sliding vehicle door configured for moving in relation to a track member of a vehicle. The roller assembly comprises a bracket structure comprising a first inner horizontal guide roller and a second inner horizontal guide roller arranged to interact with an inner vertical surface of the track member. The invention also relates to a system comprising a roller assembly for a sliding vehicle door and a track member of a vehicle.

BACKGROUND

Sliding doors for vehicles are known in the art. Sliding doors move by running roller assemblies in track members. The track members are arranged in the vehicle body with the roller assembly attached to the door by means of a roller assembly arm. One example of a roller assembly can be found in US 2011/0089714 A.

Within the development of autonomous drive vehicles, a significant trend is represented by having double-sliding doors system, i.e. a door system where both the forward and the rear door are arranged to slide open. This provides users a welcome feeling making them free to choose whether to seat in the front area or in the rear area.

A double-sliding door system puts different demands on the roller assemblies that assist in sliding the doors open and close. There is thus a need for an improved roller assembly.

SUMMARY

An objective of the disclosure is to provide a roller assembly for a sliding vehicle door configured for moving in relation to a track member of a vehicle.

The disclosure relates to a roller assembly for a sliding vehicle door configured for moving in relation to a track member of a vehicle. The roller assembly comprises a bracket structure comprising a first inner horizontal guide roller and a second inner horizontal guide roller arranged to interact with an inner vertical surface of the track member. The bracket structure further comprises at least a first vertical guide roller and a second vertical guide roller arranged to interact with a first inner surface of the track member. A resiliently arranged rotatable member is arranged to interact with a second inner surface of the track member. At least one outer horizontal guide roller arranged to interact with an outer vertical surface of the track member.

When one track member used to open and close the door, e.g. the upper track member, is omitted by design, one point of contact and thereby one point of support is no longer available to support the door's weight and to balance forces acting on the door. This means that the door is more susceptible to undesired movement when transitioning from a closed position to an open position. This is done in for instance a B-pillar less vehicle, i.e. a vehicle where the B-pillar is omitted by design, where the upper track member is omitted both for practical and aesthetic reasons. Alternatively, the lower track member can be omitted instead. Forces acting on the door in different directions may cause this unwanted movement and/or torque in directions that are not in the opening closing directions. This may lead to that the door oscillates during opening and closing of the door and/or to unwanted sound during opening and closing. The addition to an existing roller assembly of at least a first vertical guide roller and a second vertical guide roller arranged to interact with a first inner surface of the track member, a resiliently arranged rotatable member arranged to interact with a second inner surface of the track member and at least one outer horizontal guide roller arranged to interact with an outer vertical surface of the track member, creates the support on the track member by the roller assembly necessary to sustain the weight of a vehicle door using only a middle track member and a lower track member when transitioning from a closed position to an open position. In this example, the roller assembly is intended to be used in the lower track member. The above advantages are also valid if the lower track member is omitted by design and the roller assembly is used in the upper track member.

In some cases, the upper (or alternatively lower) track member is open, allowing a roller assembly to exit/enter the track member during closing and opening of the door. In these cases, a roller assembly according to the invention can also be beneficial for bearing the weight of the door and balancing the forces acting on the door.

Using a first and a second vertical guide roller arranged to interact with a first inner surface of the track member creates horizontal stabilization. The resiliently arranged rotatable member arranged to interact with a second inner surface of the track member removes the vertical gap that exist in prior art solutions and reduces the torque that can cause the door to wobble. The resilient arrangement of the rotatable member ensures that the rotatable member is always in contact with the second inner surface of the track member and allows for varying tolerances of the track member. Using at least one outer horizontal guide roller arranged to interact with an outer vertical surface of the track member stabilizes the door laterally.

The resiliently arranged rotatable member may be arranged between the first vertical guide roller and the second vertical guide roller on the bracket structure, wherein the rotatable member may essentially be aligned with a vertical plane of rotation of the first vertical guide roller and the second vertical guide roller.

This arrangement of the resiliently arranged rotatable member on the bracket structure creates an increased stability of the door during opening and closing of the door.

A first hub of the first vertical guide roller, a second hub of the second vertical guide roller and a central point of the rotatable member may be arranged in a triangular relationship in the vertical plane of rotation of the first vertical guide roller and the second vertical guide roller.

This arrangement of the resiliently arranged rotatable member, the first vertical guide roller and the second vertical guide roller on the bracket structure ensures that the roller assembly can counteract torque in several directions simultaneously, further increasing the stabilization of the door during opening and closing.

The resiliently arranged rotatable member may comprise a ball bearing arranged in a spring-loaded seat attached to the bracket structure.

This is a cost effective and durable component used in the roller assembly. The ball bearing can be made of metal, but it can also be made of a durable hard plastic such as nylon, HDPE or UHMW.

The bracket structure may comprise a first outer horizontal guide roller and a second outer horizontal guide roller arranged to interact with an outer vertical surface of the lower track member.

Adding a second outer horizontal guide roller further increases the lateral stabilization of the door during opening and closing.

The at least one outer horizontal guide roller may be arranged in an outer horizontal plane of rotation separated from an inner horizontal plane of rotation in which the first inner horizontal guide roller and the second inner horizontal guide roller is arranged.

By separating the outer horizontal plane of rotation, i.e. the plane in which the outer horizontal guide rollers are arranged, from the inner horizontal plane of rotation, i.e. the plane in which the outer horizontal guide rollers are arranged, an increased resistance to torque is added as the separation of the planes creates a lever arm between the two planes.

The at least one outer horizontal guide roller may be arranged on an outer horizontal guide roller bracket arranged to be attached to the bracket structure.

When using either one or more outer horizontal guide rollers, they may be arranged on an outer horizontal guide roller bracket arranged to be attached to the bracket structure. In this way, the roller assembly can be adapted to several door types and/or door weights, depending on the amount of stabilization that is required for each specific door, without having to change the bracket structure on which the first vertical guide roller, second vertical guide roller and resiliently arranged rotatable member are arranged.

The disclosure further relates to a vehicle door comprising a lower roller assembly according to the above description, wherein the lower roller assembly is rotatably attached to a roller assembly arm. A vehicle door adapted to use this system comprises a roller assembly arm attached to the vehicle door onto which roller assembly arm the roller assembly is rotatably attached. The roller assembly arm with the roller assembly is arranged to interact with a track member arranged in the vehicle body.

The disclosure further relates to a vehicle body comprising a lower roller assembly according to the above description, wherein the lower roller assembly is rotatably attached to a roller assembly arm. The opposite of the arrangement of the preceding paragraph is also possible, i.e. that the track member is arranged in the vehicle door and that the roller assembly arm with the roller assembly is attached to the vehicle body.

The disclosure further relates to a system comprising a roller assembly for a sliding vehicle door and a track member of a vehicle, wherein the roller assembly is configured for moving in relation to the track member, the roller assembly comprising a bracket structure comprising a first inner horizontal guide roller and a second inner horizontal guide roller arranged to interact with an inner vertical surface of the track member, characterized in that the bracket structure further comprises at least a first vertical guide roller and a second vertical guide roller arranged to interact with a first inner surface of the track member, a resiliently arranged rotatable member arranged to interact with a second inner surface of the track member and at least one outer horizontal guide roller arranged to interact with an outer vertical surface of the track member.

The advantages of the system are the same as stated above.

The track member may be a lower track member, the first inner surface may be a lower inner surface and the second inner surface may be an upper inner surface. Alternatively, the track member may be an upper track member, the first inner surface may be an upper inner surface and the second inner surface may be a lower inner surface.

The roller assembly may be rotatably attached to a roller assembly arm, wherein the roller assembly arm with the roller assembly is arranged to interact with the track member. The roller assembly according to the disclosure works well when the track member is a lower track member and the upper track member is omitted by design from the vehicle. The roller assembly can however also be used in an upper track member when the lower track member is omitted by design.

The disclosure further relates to a vehicle comprising a system according to the above description. The vehicle may be a B-pillarless vehicle which provides a large opening into the vehicle when both the front and rear doors are open, creating a welcome feeling making an occupant free to choose whether to seat in a front seat or in a rear seat.

DETAILED DESCRIPTION

In the context of this description, when referring to the orientation of the guide rollers, horizontal guide roller means that the plane of rotation of the guide roller is essential horizontal and vertical guide roller means that the plane of rotation of the guide roller is essentially vertical.

Horizontal and vertical in reference to the surfaces of the track member are intended to be interpreted such that the extension of the surfaces are essentially in a horizontal plane and a vertical plane respectively.

The examples shown relates to a rear door of a vehicle. The roller assembly according to the disclosure can also be used for a front door of a vehicle, a side door for a truck or lorry, a luggage compartment door, a door for a train car and other cargo vehicles.

Figure 1A:
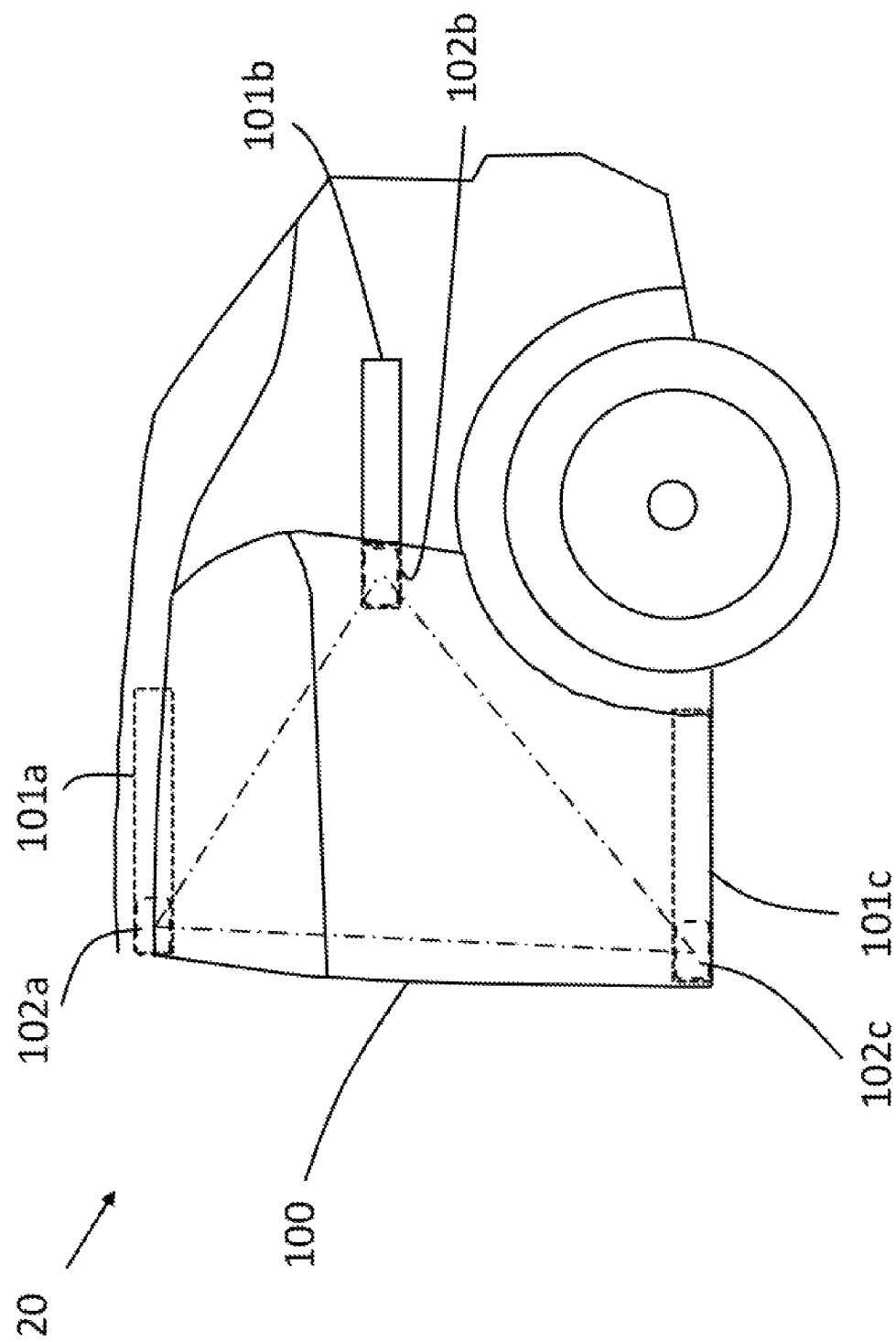
FIGS. 1A and 1B schematically show a rear part of a vehicle comprising a sliding door, with the sliding door in a closed and open position respectively, FIG. 2 schematically shows a side view of a prior art roller assembly, FIGS. 3A and 3B schematically show a rear part of a vehicle comprising a sliding door using the roller assembly according to the disclosure, FIG. 4 schematically shows a perspective view of a roller assembly for a vehicle door according to an example embodiment of the disclosure, FIG. 5 schematically shows a side view of the roller assembly according to an example embodiment of the disclosure, FIG. 6 schematically shows a side view of a roller assembly according to an example embodiment of the disclosure interacting with a track member, FIG. 7 schematically shows a front view of the roller assembly according to an example embodiment of the disclosure, FIG. 8 schematically shows a perspective view of a roller assembly arm to which the roller assembly is rotatably attached, FIG. 9 schematically shows a perspective view of a roller assembly for a vehicle door according to an example embodiment of the disclosure.

FIG. 1A schematically shows a rear part of a vehicle 20 comprising a sliding door 100 according to a prior art arrangement. The vehicle 20 has an extension along a length or X direction, along a width or Y direction and along a height or Z direction. The sliding door 100 uses three track members 101a-101c, an upper track member 101a, a middle track member 101b and a lower track member 101c for the opening and closing of the sliding door 100. In each track member 101a-101c, an upper roller assembly 102a, a middle roller assembly 102b and a lower roller assembly 102c are arranged to run respectively. The middle track member 102b is arranged on the outside of the vehicle 20, which can be considered by users as an unattractive feature. This arrangement for a sliding door 100 is known in the art.

In FIG. 1A, the sliding door 100 is in its closed position. The upper roller assembly 102a, the middle roller assembly 102b and the lower roller assembly 102c are arranged in a triangular arrangement, as indicated by dash-dot lines, thereby providing three points of contact separated both vertically and horizontally over the sliding door 100. This triangular arrangement provides a good support for the sliding door's weight.

Figure 1B:
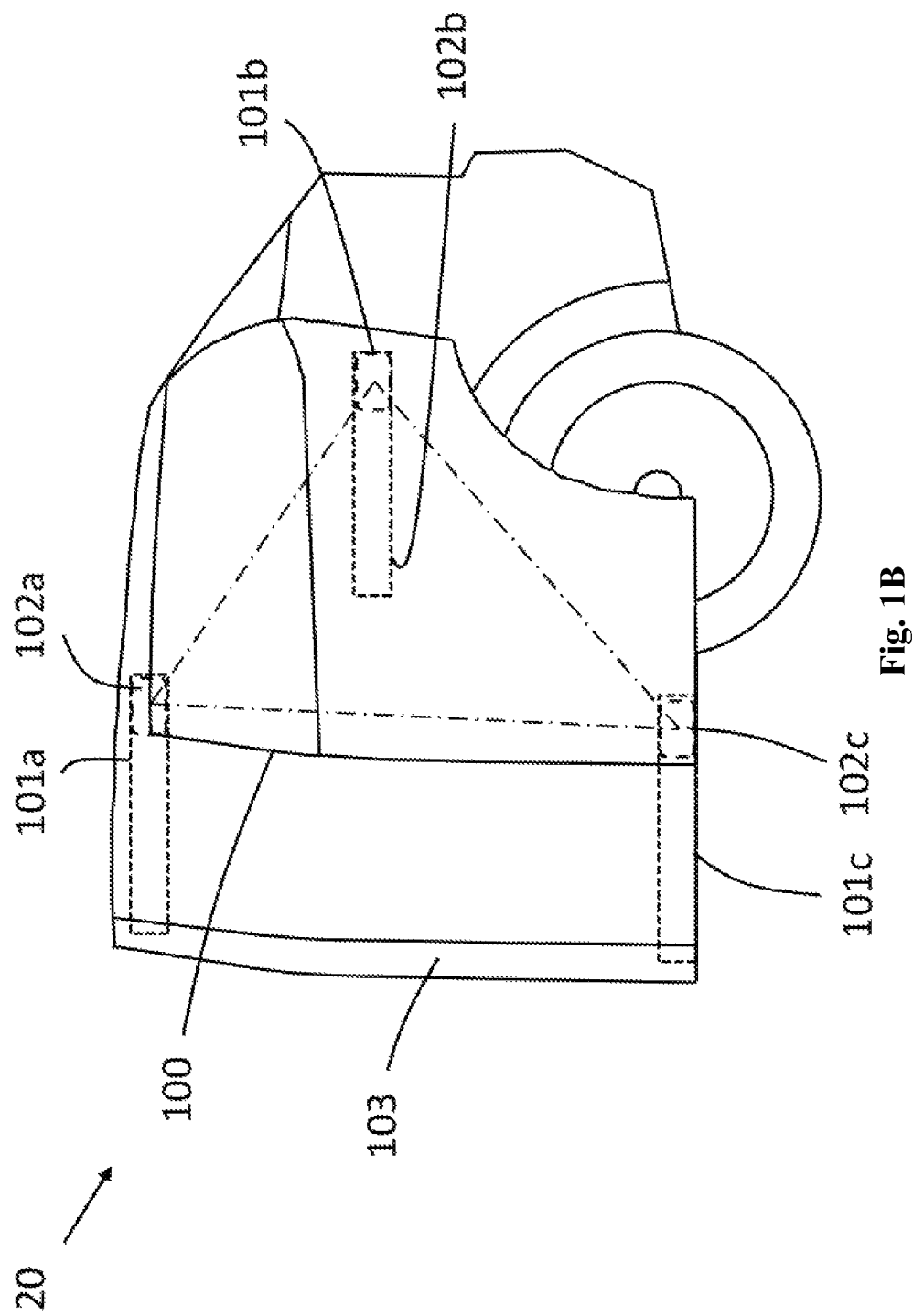

FIG. 1B schematically shows a rear part of a vehicle 20 comprising a sliding door 100 in the open position. In the open position, the upper roller assembly 102a, the middle roller assembly 102b and the lower roller assembly 102c are still arranged in a triangular arrangement, providing three points of contact separated both vertically and horizontally, thereby providing a good support for the sliding door's 100 weight in this position as well. The vehicle's 20 B pillar 103 is schematically shown.

Figure 2:
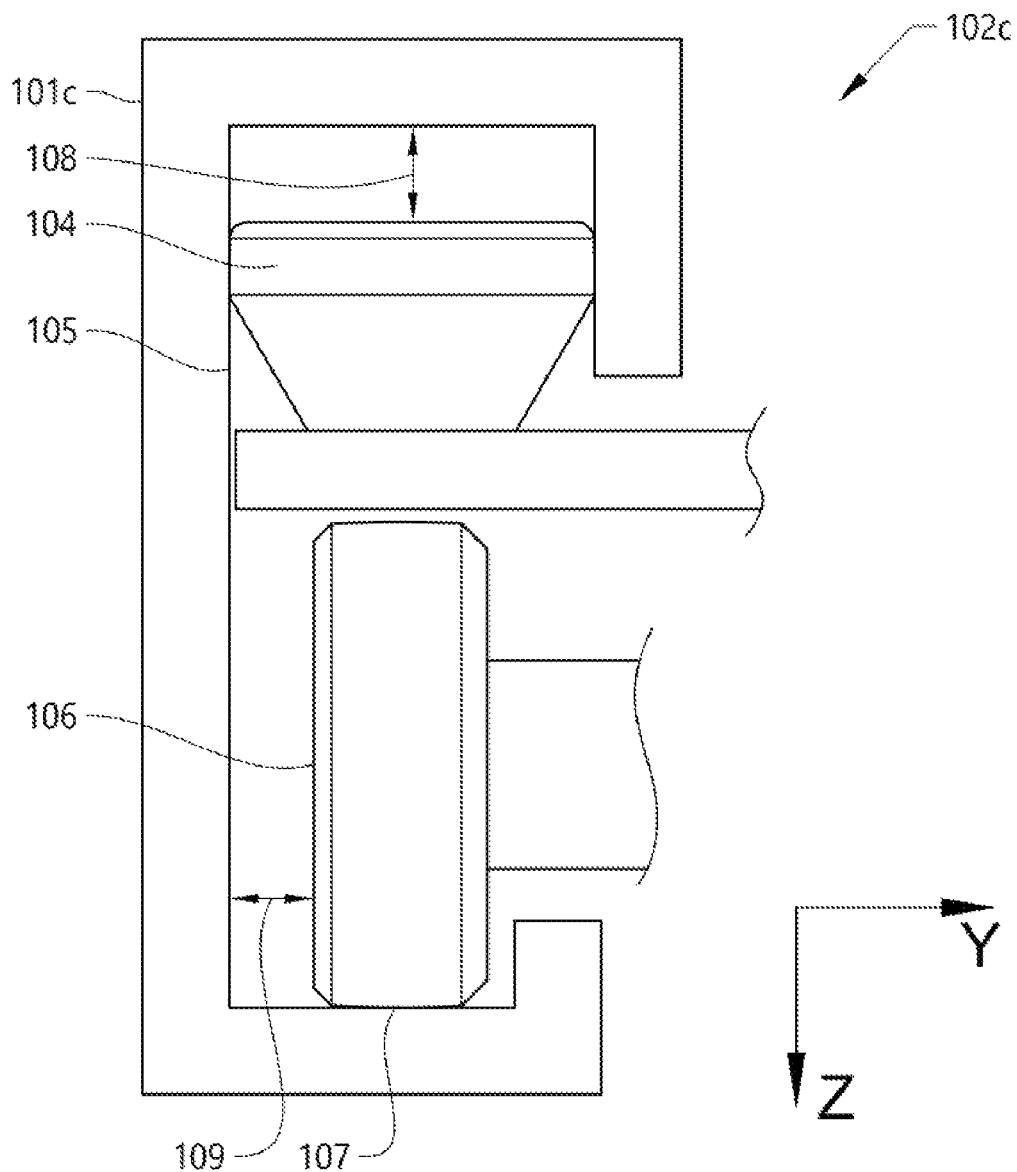

FIG. 2 schematically shows a side view of a prior art lower roller assembly 102c, exemplified by US 2011/0089714 A. The prior art lower roller assembly 102c comprises a bracket structure (not shown) comprising a first inner horizontal guide roller 104 and a second inner horizontal guide roller (not shown) arranged to interact with an inner vertical surface 105 of a track member 101, in this example the lower track member 101c. The bracket structure further comprises a single vertical guide roller 106 arranged to interact with an inner horizontal surface 107 of the lower track member 101c.

As can be seen from the figure, there is a vertical gap 108 between the first inner horizontal guide roller 104 and the inner horizontal surface 107 of the track member 101c (as well as between the second inner horizontal guide roller and the inner horizontal surface of the track member). There is also a horizontal gap 109 between the vertical guide roller 106 and the inner vertical surface 105 of the track member 101c.

When used in applications with an upper track member, a middle track member and a lower track member, these gaps does not lead to large amplitude movements during opening and closing as the three roller assemblies are arranged to counteract such movements. However, should one track member, such as e.g. the upper track member, be omitted by design in order to make removal of the B-pillar possible, using the prior art roller assembly 102c in the lower track member 101c would lead to unwanted movements of the door due to torque acting in directions which would not be counteracted by an upper roller assembly in the upper track member as when using three track members.

Figure 3A:
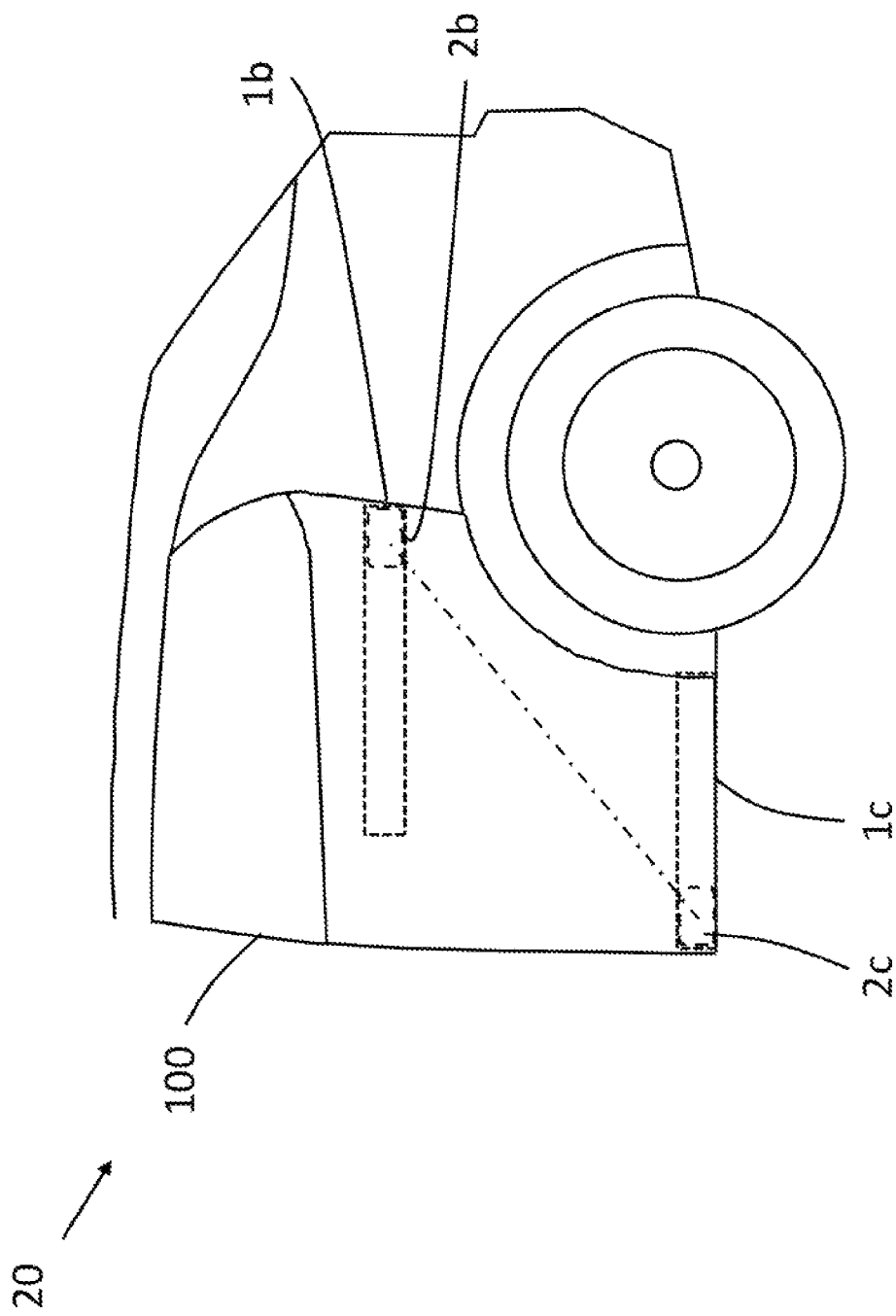

FIG. 3A schematically shows a rear part of a vehicle 20 comprising a sliding door 100. In this example, the sliding door 100 uses two track members 1b, 1c for the opening and closing of the sliding door 100, a middle track member 1b arranged in the sliding door 100 and a lower track member 1c arranged in a body of the vehicle 20. The vehicle 20 is a B-pillarless vehicle, where the upper track member and the B-pillar are omitted by design. In each track member 1b, 1c, a middle roller assembly 2b and a lower roller assembly 2c is arranged to run respectively. This setup for a sliding door 100 takes advantage of the lower roller assembly 2c according to the disclosure. In FIG. 3A, the sliding door 100 is in its closed position. By only using two track members 1b, 1c, the middle roller assembly 2b and the lower roller assembly 2c are arranged in a linear arrangement as indicated by the dash-dot line, providing two points of contact separated vertically and horizontally. Approximately 50% of the door's weight is borne by each roller assembly 2b, 2c with the centre of gravity of the door located between the two roller assemblies 2b, 2c. In this way, no resulting torque is acting in the negative Y direction (i.e. out from the figure) on either roller assembly. Alternatively, the lower track member is omitted by design. The roller assembly 2c in the description above is then used in the upper track member with the roller assembly inverted, i.e. rotated 180° along its lateral axis, i.e. the axis extending in the Y direction.

Figure 3B:
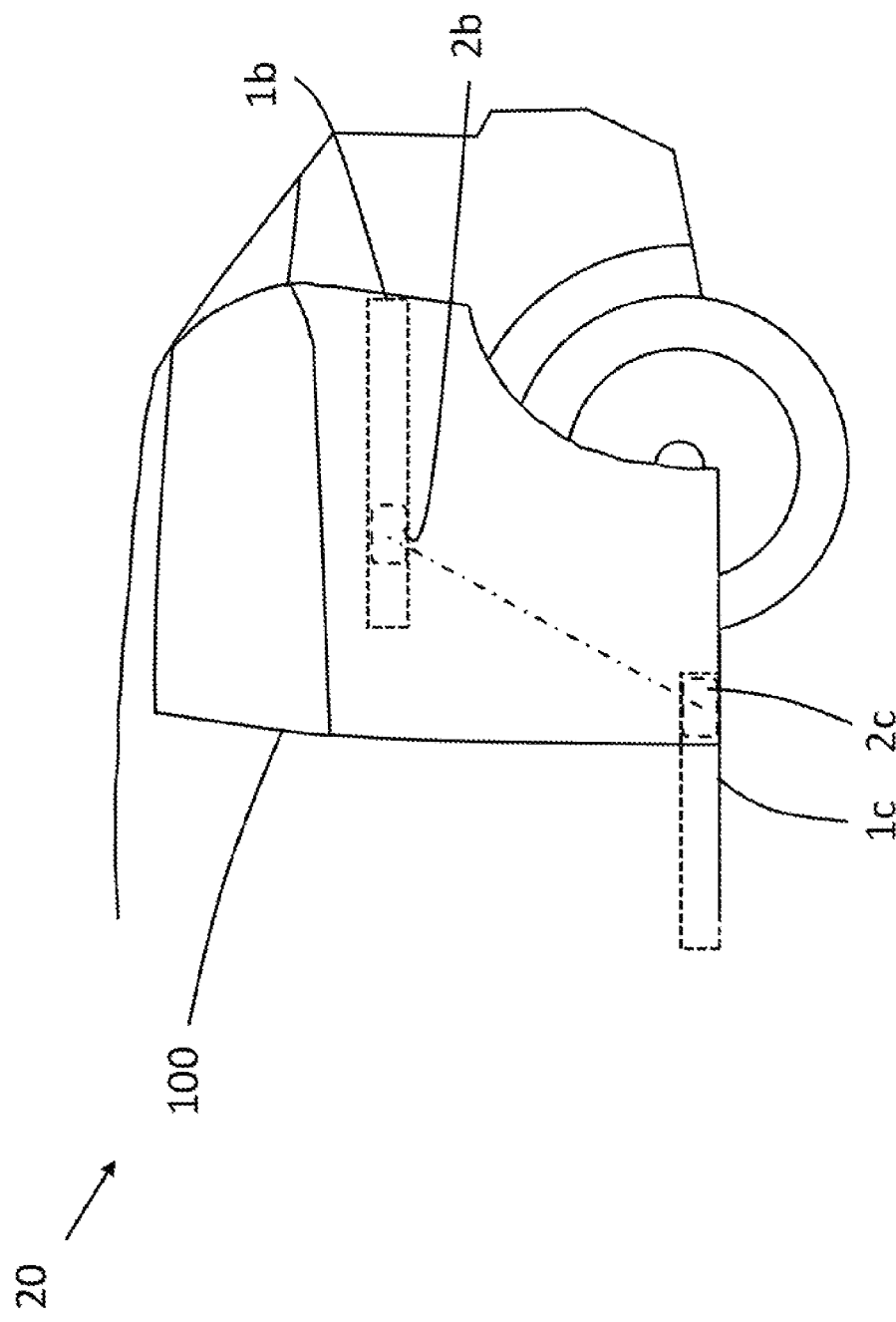

FIG. 3B schematically shows a rear part of a vehicle 20 comprising a sliding door 100 in the open position. As can be seen, the vehicle 20 comprises no B pillar as described above, leading to a large, welcoming opening into the vehicle when both the front and rear doors are open. In the open position, the middle roller assembly 2b and the lower roller assembly 2c have moved different distances, thereby shortening the distance between the two roller assemblies 2b, 2c. The result is that more of the weight is borne by the middle roller assembly 2b, leading to that a resulting force in the Z direction creates a torque that acts on the roller assemblies 2b, 2c. In addition, as there is no upper roller assembly, forces acting in the Y direction cannot be counteracted in the same way as when using an upper track member. The lower roller assembly 2c thus has to compensate for the removal of the upper track member. Based on the above description of the gaps present when using a prior art roller assembly 102c, the lower roller assembly 2b according to the disclosure has to be adapted.

Figure 4:
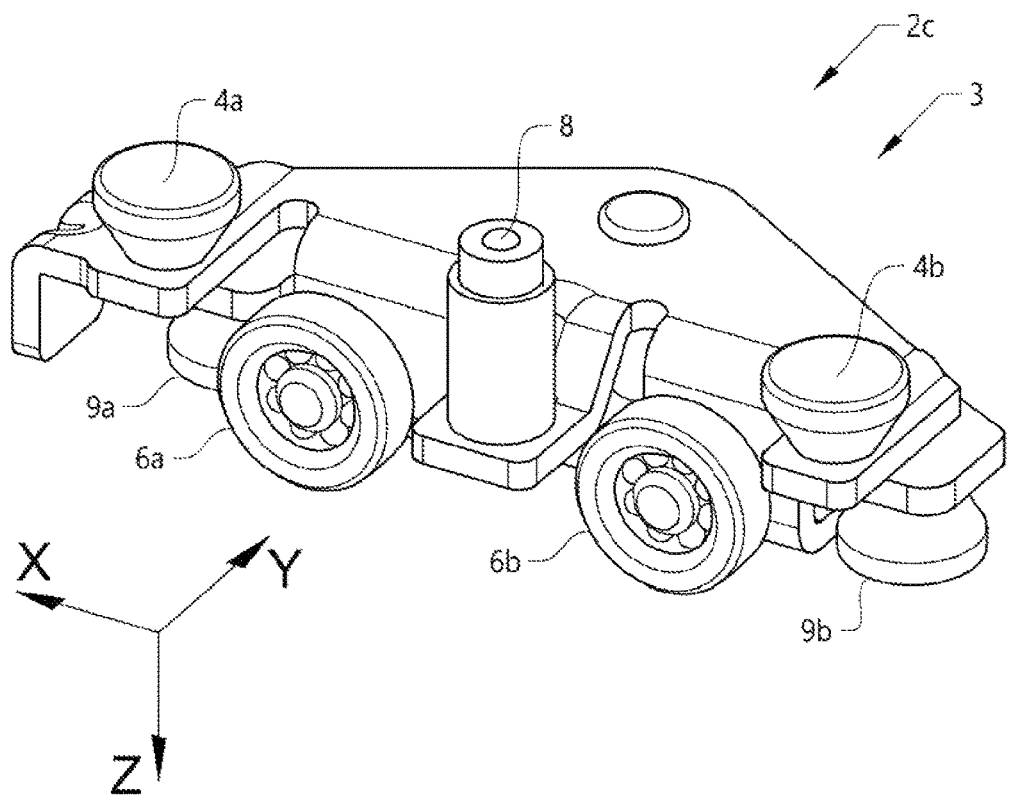

FIG. 4 schematically shows a perspective view of a roller assembly 2c for a vehicle door 100 according to an example embodiment of the disclosure. The roller assembly 2c comprises a bracket structure 3 comprising a first inner horizontal guide roller 4a and a second inner horizontal guide roller 4b arranged to interact with an inner vertical surface 5 of the track member 1c. The bracket structure 3 further comprises a first vertical guide roller 6a and a second vertical guide roller 6b arranged to interact with a first inner horizontal surface 7a of the track member 1c. A resiliently arranged rotatable member arranged 8 to interact with a second inner horizontal surface 7b of the track member 1c is arranged between the first vertical guide roller 6a and the second vertical guide roller 6b on the bracket structure 3. The bracket structure 3 also comprises a first outer horizontal guide roller 9a and a second outer horizontal guide roller 9b arranged to interact with an outer vertical surface 10 of the track member 1c.

The differences between the lower roller assembly 2c according to the disclosure and the prior art roller assembly 102c are the following:

A second vertical guide roller 6b arranged to interact with a first inner horizontal surface 7a of the track member 1c has been added to the bracket structure 3.

A resiliently arranged rotatable member 8 arranged to interact with a second inner horizontal surface 7b of the track member 2c has been added to the bracket structure 3.

A first outer horizontal guide roller 9a and a second outer horizontal guide roller 9b arranged to interact with an outer vertical surface 10 of the track member 2c has been added to the bracket structure 3.

These three added features compensates for the removal of the upper track member and provides stability along the X, Y and Z directions during opening and closing of the sliding door 100.

The placement of the respective vertical guide rollers 6a, 6b, inner horizontal guide rollers 4a, 4b and outer horizontal guide rollers 9a, 9b on the bracket structure 3 are shown as an example in the figures and can be adapted to other configurations while still providing the same advantages.

Figure 5:
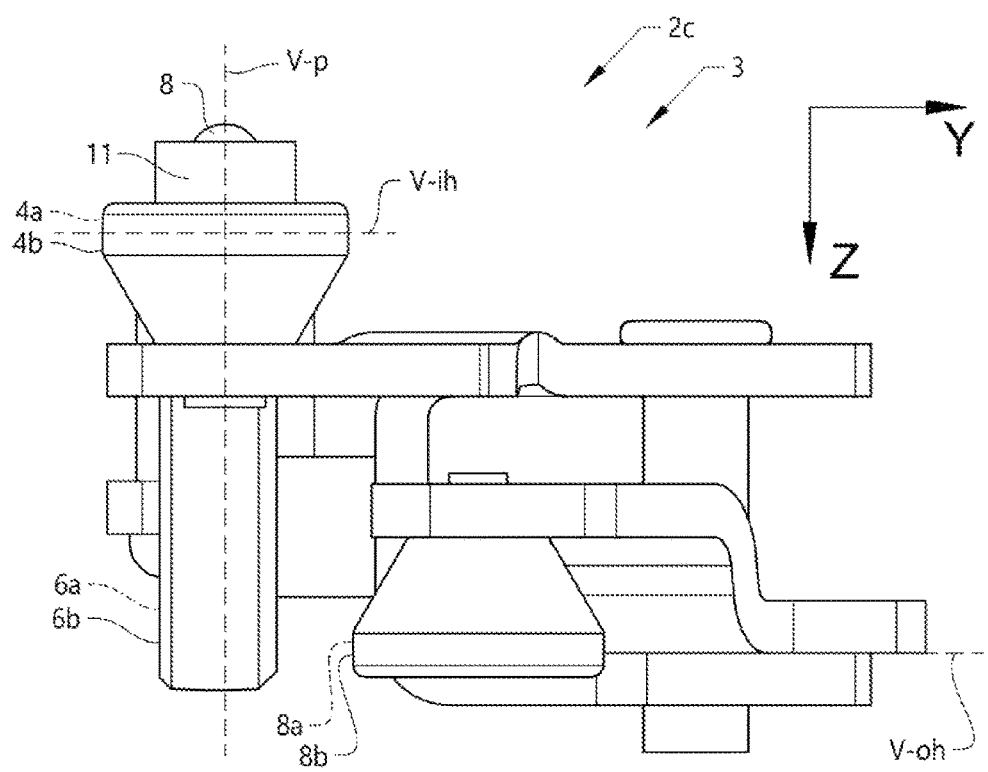

FIG. 5 schematically shows a side view of the roller assembly 2c according to an example embodiment of the disclosure. In this view, the relative positions of the first vertical guide roller 6a and second vertical guide roller 6b and the resiliently arranged rotatable member 8 on the bracket structure 3 can be seen. The vertical guide rollers 6a, 6b are arranged on bearings (not shown) attached to the bracket structure 3 and rotate in a vertical plane of rotation V-p extending through the vertical guide rollers 6a, 6b. The resiliently arranged rotatable member 8 is arranged to rotate in a spring-loaded seat 11 attached to the bracket structure 3 where the vertical extension of the spring-loaded seat 11 and thereby of the resiliently arranged rotatable member 8 is essentially aligned with the vertical plane of rotation V-p of the first vertical guide roller 6a and the second vertical guide roller 6b.

The relative positions of the outer horizontal guide rollers 9a, 9b and the inner horizontal guide rollers 4a, 4b can also be seen. In FIG. 5, the first outer horizontal guide roller 9a and second horizontal guide roller 9b are arranged in an outer horizontal plane of rotation V-oh which is separated in vertical distance from an inner horizontal plane of rotation V-ih in which the first inner horizontal guide roller 4a and the second inner horizontal guide roller 4b are arranged. The first outer horizontal guide roller 9a and second horizontal guide roller 9b can alternatively be arranged in an outer horizontal plane of rotation V-oh which is essentially the same as the inner horizontal plane of rotation V-ih in which the first inner horizontal guide roller 4a and the second inner horizontal guide roller 4b are arranged.

Figure 6:
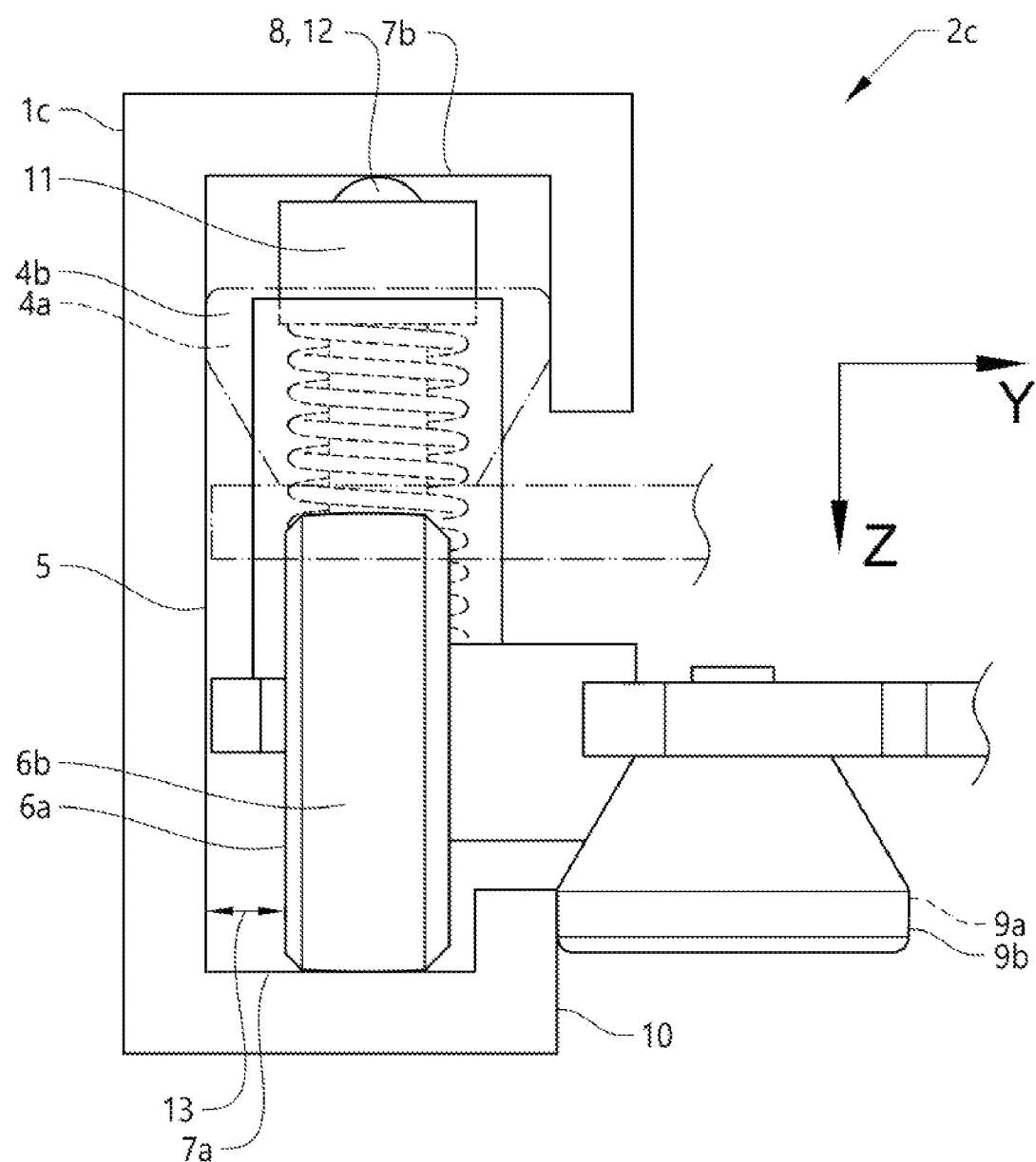

FIG. 6 schematically shows a side view of a roller assembly 2c according to an example embodiment of the disclosure interacting with the track member 1c. In the figure, it can be seen that the second vertical guide roller 6b interacts with the first inner horizontal surface 7a of the track member 1c. The second vertical guide roller 6b allows for the increased weight that must be borne by the roller assembly 2c as the upper track member has been omitted by design from the vehicle. The first vertical guide roller 6a is arranged behind the second vertical guide roller 6b.

Further, the resiliently arranged rotatable member 8 can be seen to interact with the second inner horizontal surface 7b of the track member 1c. The resiliently arranged rotatable member 8, in this example a ball bearing 12 mounted in a spring-loaded seat 11, is biased to always press against the second inner horizontal surface 7b of the track member 1c in order to remove the rocking in both the positive and negative Z direction that otherwise would have arisen if a prior art roller assembly 102c would have been used.

Further, the interaction of both the outer horizontal guide rollers 9a, 9b and the inner horizontal guide rollers 4a, 4b with the track member 1c can be seen. The first inner horizontal guide roller 4a and the second inner horizontal guide roller 4b interacts with the inner vertical surface 5 of the track member 1c. In order to reduce movement in the Y direction, the first and second outer horizontal guide rollers 9a, 9b interact with an outer vertical surface 10 of the track member 1c, thereby counteracting any movement that would have been caused by the horizontal gap 13 inside the track member between the inner vertical surface 5 of track member and the inner horizontal guide rollers 4a, 4b.

Figure 7:
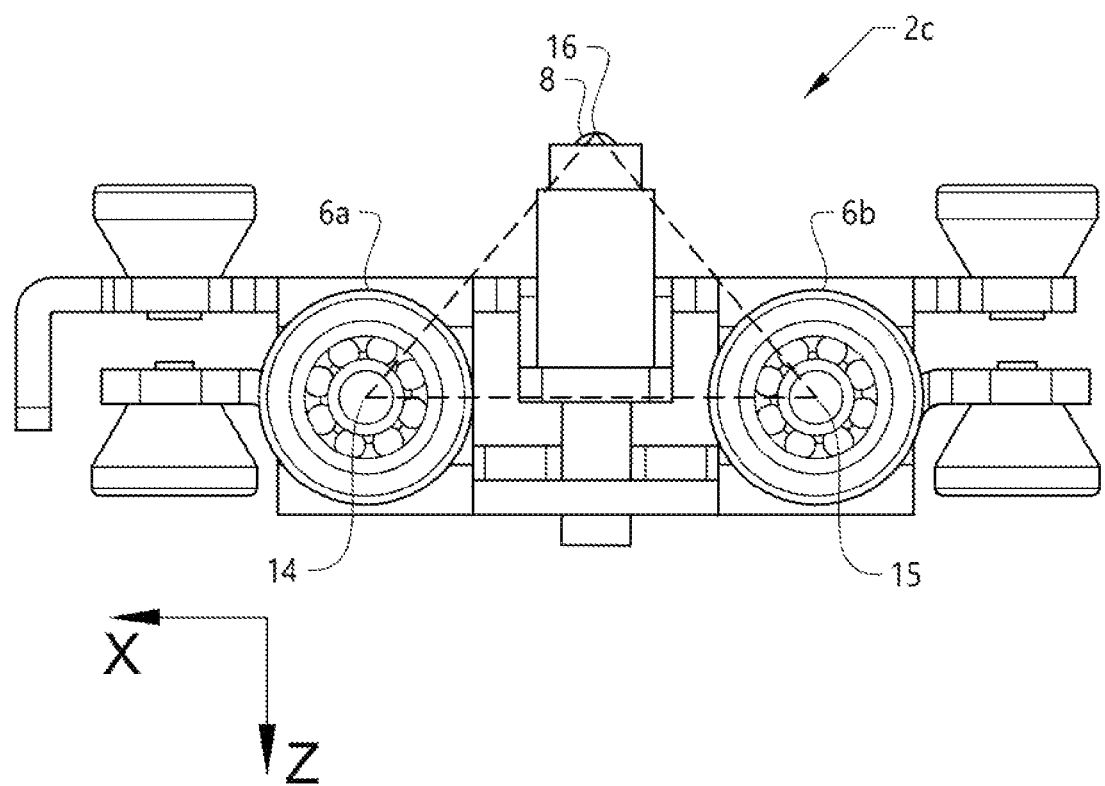

FIG. 7 schematically shows a front view of the roller assembly 2c according to an example embodiment of the disclosure. A first hub 14 of the first vertical guide roller 6a running through the centre of the first vertical guide roller 6a, a second hub 15 of the second vertical guide roller 6b and a contacting point 16 of the resiliently arranged rotatable member 8 are arranged in a triangular relationship essentially in the vertical plane of rotation V-p of the first vertical guide roller 6a and the second vertical guide roller 6b. This is a way to create a triangular relationship as was shown in FIG. 2a for a sliding door 100 with three track members in the guide roller 1c itself, thereby creating stability during opening and closing of the sliding door 100.

Figure 8:
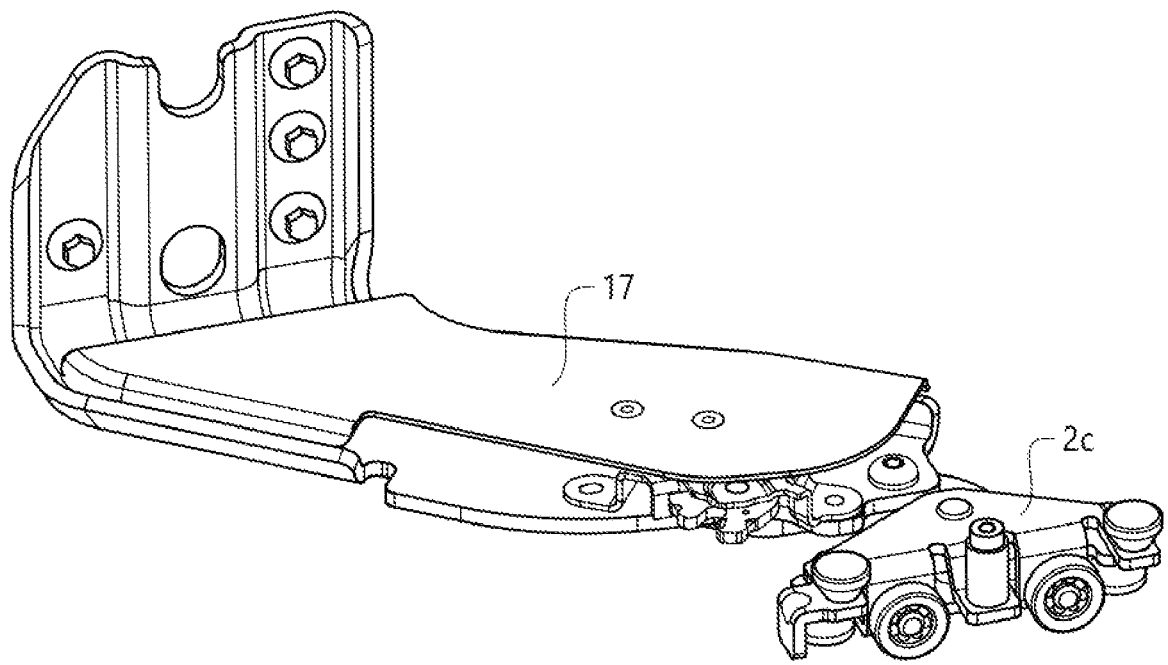

FIG. 8 schematically shows a perspective view of a roller assembly arm 17 to which the roller assembly 2c is rotatably attached. The roller assembly arm 17 can be mounted to the sliding door 100 onto which roller assembly arm 17 the roller assembly 2c according to the disclosure is rotatably attached. The roller assembly arm 17 with the roller assembly 2c is arranged to interact with a track member 1c arranged in the vehicle body. The opposite is also possible, i.e. that the track member 1c is arranged in the vehicle door 100 and that the roller assembly arm 17 with the roller assembly 1c is attached to the vehicle body.

Figure 9:
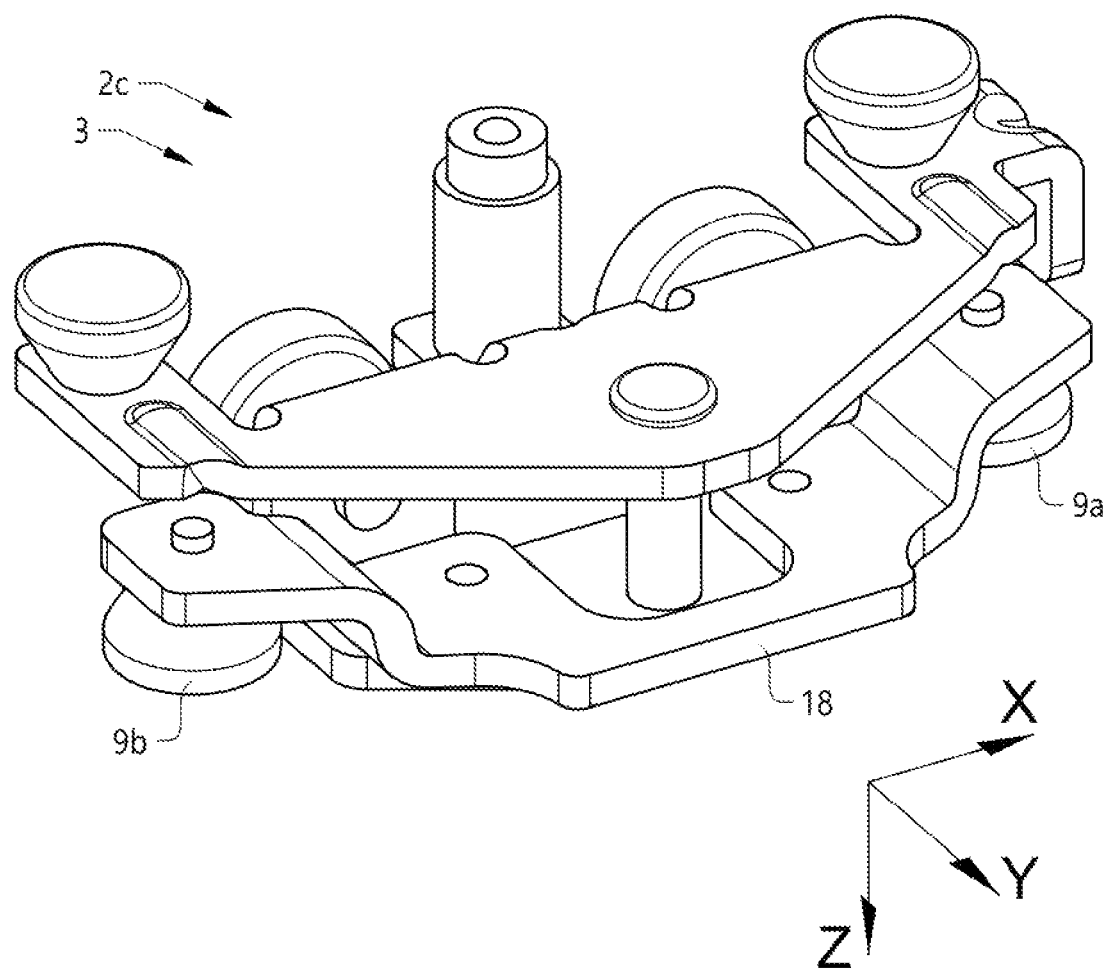

FIG. 9 schematically shows a perspective view of a roller assembly 1c for a vehicle door 100 according to an example embodiment of the disclosure. As can be seen in the figure, the first outer horizontal guide roller 9a and the second horizontal guide roller 9b are arranged on a separate outer horizontal guide roller bracket 18 attached to the bracket structure 3. This makes adaptation of the guide roller 1c easier as it is possible to change the outer horizontal guide rollers 9a, 9b by changing the entire outer horizontal guide roller bracket 18.

Although the disclosure has been illustrated and described in detail in the drawings and foregoing description, such illustration and description are to be considered illustrative or exemplary and the disclosure is not limited to the disclosed example embodiments. The examples illustrated relates to a lower roller assembly. It is possible to adapt the roller assembly to function as an upper roller assembly where the lower track member has been omitted by design. In that case, the roller assembly is inverted along the axis that extends in the Y direction or the lateral axis.

What is claimed is:

1. A roller assembly for a sliding vehicle door configured for moving in relation to a track member of a vehicle, the roller assembly comprising a bracket structure comprising a first inner horizontal guide roller and a second inner horizontal guide roller arranged to interact with an inner vertical surface of the track member, wherein the bracket structure further comprises at least a first vertical guide roller and a second vertical guide roller arranged to interact with a first inner horizontal surface of the track member, a resiliently arranged rotatable member arranged to interact with a second inner horizontal surface of the track member and at least one outer horizontal guide roller arranged to interact with an outer vertical surface of the track member.

2. The roller assembly according to claim 1, wherein the resiliently arranged rotatable member is arranged between the first vertical guide roller and the second vertical guide roller on the bracket structure, wherein the resiliently arranged rotatable member is essentially aligned with a vertical plane of rotation of the first vertical guide roller and the second vertical guide roller.

3. The roller assembly according to claim 2, wherein a first hub of the first vertical guide roller, a second hub of the second vertical guide roller and a contacting point of the resiliently arranged rotatable member are arranged in a triangular relationship essentially in the vertical plane of rotation of the first vertical guide roller and the second vertical guide roller.

4. The roller assembly according to claim 1, wherein the resiliently arranged rotatable member comprises a ball bearing arranged in a spring-loaded seat attached to the bracket structure.

5. The roller assembly according to claim 1, wherein the at least one outer horizontal guide roller comprises a first outer horizontal guide roller and a second outer horizontal guide roller that are each arranged to interact with the outer vertical surface of the track member.

6. The roller assembly according to claim 1, wherein the at least one outer horizontal guide roller is arranged in an outer horizontal plane of rotation separated from an inner horizontal plane of rotation in which the first inner horizontal guide roller and the second inner horizontal guide roller are arranged.

7. The roller assembly according to claim 1, wherein the at least one outer horizontal guide roller is arranged on an outer horizontal guide roller bracket arranged to be attached to the bracket structure.

8. A vehicle door comprising the roller assembly according to claim 1, wherein the roller assembly is rotatably attached to a roller assembly arm.

9. A vehicle body comprising the roller assembly according to claim 1, wherein the roller assembly is rotatably attached to a roller assembly arm.

10. A system comprising a roller assembly for a sliding vehicle door and a track member of a vehicle, wherein the roller assembly is configured for moving in relation to the track member, the roller assembly comprising a bracket structure comprising a first inner horizontal guide roller and a second inner horizontal guide roller arranged to interact with an inner vertical surface of the track member, wherein the bracket structure further comprises at least a first vertical guide roller and a second vertical guide roller arranged to interact with a first inner horizontal surface of the track member, a resiliently arranged rotatable member arranged to interact with a second inner horizontal surface of the track member and at least one outer horizontal guide roller arranged to interact with an outer vertical surface of the track member.

11. The system according to claim 10, wherein the track member is one of:
a lower track member, the first inner horizontal surface is a lower inner horizontal surface and the second inner horizontal surface is an upper inner horizontal surface, or
an upper track member, the first inner horizontal surface is an upper inner horizontal surface and the second inner horizontal surface is a lower inner horizontal surface.

12. The system according to claim 10, wherein the roller assembly is rotatably attached to a roller assembly arm, wherein the roller assembly arm with the roller assembly is arranged to interact with the track member.

13. A vehicle comprising a system according to claim 10.

14. A vehicle according to claim 13, wherein the vehicle is a B-pillarless vehicle.

* * * * *